Sept. 22, 1964

T. HAFNER 3,150,371

ELECTROMAGNETIC WAVE TRANSMISSION SYSTEMS

Filed Jan. 15, 1960

INVENTOR
THEODORE HAFNER
BY

ATTORNEY

United States Patent Office 3,150,371
Patented Sept. 22, 1964

3,150,371
ELECTROMAGNETIC WAVE TRANSMISSION
SYSTEMS
Theodore Hafner, New York, N.Y., assignor to Beam
Guidance, Inc., New York, N.Y., a corporation of
New York
Filed Jan. 15, 1960, Ser. No. 2,697
16 Claims. (Cl. 343—100)

This invention relates to electromagnetic wave transmission systems and more specifically to beam transmission, and in this connection it is an improvement over U.S. Serial No. 775,402, filed November 21, 1958, by George E. J. Goubau, now issued as Patent No. 3,101,472.

One of the objects of the invention is a beam wave guide in which phase, amplitude and expansion over the cross-section of the beam is repeatedly compensated or predeterminedly corrected by a succession of deflecting or reflecting means arranged in the path of the beam.

Another object of the invention is to produce repeated reflections along a predetermined linear wave propagation path by means of a series of pairs of deflecting or reflecting plates or horns, each pair reversing and reconstituting a predetermined direction of wave transmission and thereby reconstituting a predetermined cross-sectional phase and amplitude or expansion characteristic or configuration.

Still another object of the invention is to arrange an array of curved wave reflectors along predetermined points of the path of an electromagnetic wave beam and reversing at each point the beam onto another preferably smaller reflector arranged in the focal position of the first reflector and reconstituting the wave beam by permitting it to then pass through the first reflector.

As another object of the invention a series of curved reflecting means are arranged along the propagation path of an electromagnetic wave beam of predetermined cross-sectional phase and amplitude distribution in such a manner as to reverse the beam onto another considerably larger reflective means, in the focal position of which the first reflecting means is arranged and which, in turn, serves to redirect the beam either into a receiver system or onto another reflecting means for further reversion and redirection, respectively, and compensation of cross-sectional amplitude and phase distribution.

Figure 1:
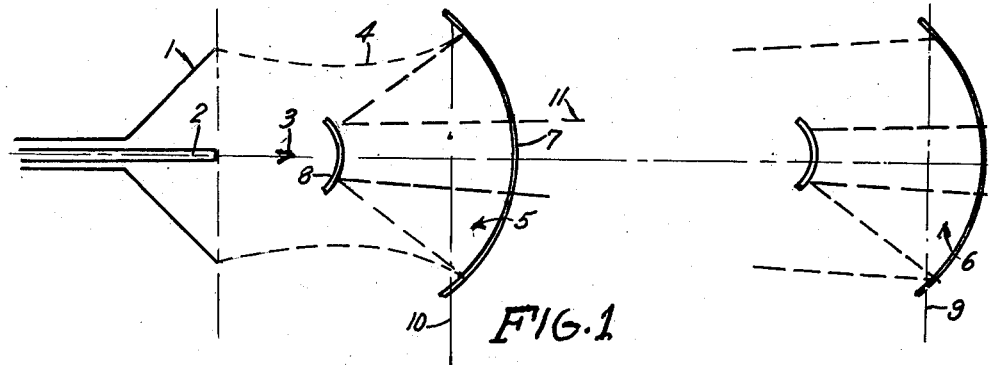

These and other objects of the invention will be more fully apparent from the drawings annexed herewith in which FIG. 1 illustrates diagrammatically a beam wave guide embodying certain features of the invention.

Figure 3:
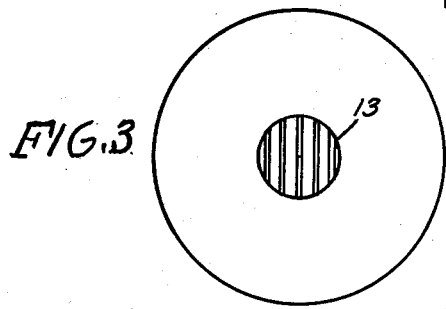
Figure 2:
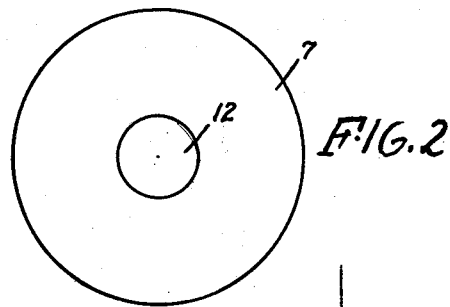

FIGS. 2 and 3, in frontal view, represent certain reflecting components of the beam wave guide in two different modifications, respectively.

Figure 4:
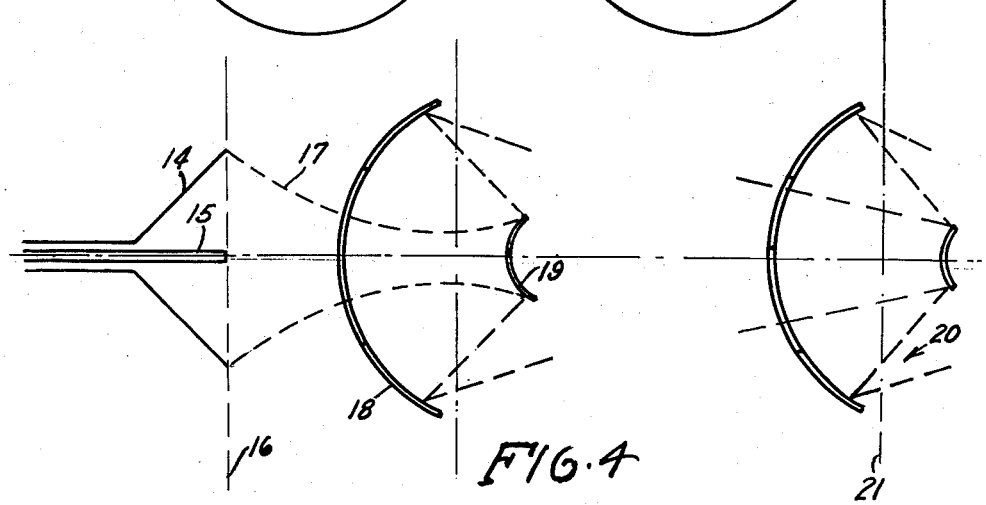

FIG. 4 represents another embodiment of the invention.

In FIG. 1 an electromagnetic beam wave is produced, by a horn 1 cooperating with a central dielectric rod 2 which serve to produce a wave beam of predetermined cross-sectional phase and amplitude distribution and, while progressing in direction 3, gradually expanding and thereby changing its cross-sectional amplitude and phase distribution.

In accordance with the invention this cross-sectional change is compensated, or at least predeterminedly corrected, by arranging in the path of the beam, schematically indicated by lines 4, a series of twin deflector or reflector units, two of which are schematically indicated at 5, 6 respectively.

Twin units 5, 6 consist each of a relatively large curved reflector plate or horn 7 (which is also very large against operating wave length) which serves to concentrate the wave beam 4 onto another, also preferably curved but substantially smaller, reflecting plate 8 arranged in the focus or reflecting plate 7. Plate 8 is so formed as to cause an expansion and phase and amplitude correction of the wave beam 4 to a predetermined configuration such as existing in cross section 9 and made, for example, substantially identical with the configuration existing at plane 10.

In order to permit the expanding beam 11 derived from curved reflecting plate 8 to pass through the curved reflecting plate 7, plate 7, at the point or area of passage, is made wave transparent either by providing an opening, as shown in FIG. 2 at 12, or by providing a wave transparent metal grid, as schematically indicated at FIG. 3 at 13.

Also, if necessary, further compensation, correction and other modification of the wave beam may be effected if required by providing in opening 12, or at any other point of the path, electromagnetic or dielectric or phase correcting plates or electron-optical lenses of otherwise well-known structures to achieve (and as also apparent from U.S. Serial No. 775,402) a desired predetermined amplitude and phase distribution as well as any desired shape of the wave path.

In order to cause further extension of the path of the wave beam with a minimum of loss, all that is necessary is to arrange at appropriate further points of the path other twin deflecting units, such as shown at 6, to achieve by double reflection substantially the same effect as by unit 5 and thereby permitting long-distance propagation of the beam wave into any desired direction and over any desired distance.

In the embodiment of the invention shown in FIG. 4, the twin deflector or reflector units, arranged to produce predetermined phase and amplitude distribution, are of somewhat different structure; in this case the beam derived from a horn unit 14, 15 with a predetermined phase and amplitude configuration prevailing in plane 16 at the opening of horn 14 produces a wave beam schematically indicated in FIG. 4 at 17 passing through a relatively large reflecting plate or horn 18 in a manner similar to that shown in FIGS. 2 and 3, onto a reflecting horn or plate 19 arranged in the focus of reflecting horn 18. The beam wave reflected from plate 18 will produce, in accordance with the invention, at a predetermined cross-section 21 a predetermined and perferably substantially the same amplitude and phase distribution prevailing in front plane 16, thereby permitting further extension of the beam to any desired distance by the consecutive arrangement in the path of the beam of a corresponding number of other twin reflecting structures, one of which is shown in FIG. 4 at 20, substantially the same structure as the twin reflecting structure 18, 19.

Reception of the beam wave guide produced in this way may be caused at any desired point by providing horn units of a similar structure, such as shown in FIG. 1 at 1, 2 and in FIG. 4 at 14, 15.

Also without exceeding the scope of the invention the beam wave may be propagated with any desired cross-section (circular, rectangular, etc.) and any desired path and, for example, instead of along a straight line, such as shown in FIGS. 1 and 4, in an angular configuration by just deviating the axis of the twin deflecting units in any appropriate manner.

I claim:
1. In an electromagnetic wave transmission system, means for producing an electromagnetic wave beam of predetermined cross-sectional amplitude and phase distribution at a certain cross-section when progressing along a predetermined path; a pair of reflecting means, one receiving said beam at a point of said path and deflecting it into the other reflecting means for producing substantially the same cross-sectional phase distribution at a further point of said path thereby reiterating the wave beam without substantially changing its cross-sectional amplitude distribution between said points, said one reflecting means including means for reflecting said beam back from the direction of said path into opposite direction for forming a beam of substantially reduced cross-section to reproduce said predetermined cross-sectional phase distribution.

2. System according to claim 1 comprising means in said first reflecting means permitting passage of said second reflected beam.

3. System according to claim 2 comprising means for repeatedly providing said two reflection means to extend said path of propagation while substantially maintaining said cross-sectional phase distribution.

4. In a method for transmitting electromagnetic waves, the steps of producing a wave beam of predetermined cross sectional phase and amplitude distribution expanding while propagating along a predetermined path and repeatedly reflecting said beam at predetermined points along said path of propagation, said beam being first reflected back into an opposite direction and then reflected from said opposite direction into the first direction, to compensate any change in cross-sectional phase distribution and substantially to reproduce said predetermined cross-sectional phase distribution without substantially changing the cross-sectional amplitude distribution of said beam between said points.

5. In an electromagnetic wave transmission system, means for producing a wave beam of predetermined cross-sectional phase and amplitude distribution gradually varying while being propagated along a predetermined path; reflecting means arranged at least at one point along said path to reflect said beam back to form a cross-section which is large against the cross-section of said beam at said one point, other reflecting means arranged at the point of said large cross-section and reflecting said beam to produce a cross-sectional phase distribution substantially identical with the first cross-sectional phase distribution thereby re-iterating the wave without substantially changing its cross-sectional amplitude distribution between said points.

6. System according to claim 5 wherein said wave beam is gradually expanding unless corrected.

7. System according to claim 5 wherein said first reflecting means has a wave transmissive area permitting passage of said beam, said area being small against said first reflecting means.

8. System according to claim 5 comprising phase correcting means arranged in said wave transmissive area.

9. System according to claim 5 comprising electron-optical means arranged in said wave transmissive area.

10. System according to claim 5 wherein said wave transmissive area consists of a single opening.

11. System according to claim 5 wherein said opening consists of several openings.

12. In an electromagnetic wave transmission system, means for producing an electromagnetic wave beam of predetermined cross-sectional phase and amplitude distribution gradually contracting while propagating along a predetermined path, means for reflecting said beam at least at one point along said path into opposite direction while expanding said beam, means for reflecting said expanded beam into the previous direction while gradually decreasing it to said previously existing cross-sectional distribution.

13. System according to claim 12 wherein said second reflecting means has a wave transmissive area permitting passage of the beam.

14. System according to claim 13 wherein said wave transmissive area includes at least one opening.

15. System according to claim 13 comprising phase correcting means arranged in said wave transmissive area.

16. System according to claim 13 comprising electron-optical means arranged in said wave transmissive area.

References Cited in the file of this patent

UNITED STATES PATENTS

| 2,212,211 | Pfund | Aug. 20, 1940 |
|---|---|---|
| 2,730,004 | Badger et al. | Jan. 10, 1956 |
| 2,920,205 | Choyke | Jan. 5, 1960 |
| 2,972,743 | Svensson et al. | Feb. 31, 1961 |
| 3,101,472 | Goubau | Aug. 20, 1963 |

FOREIGN PATENTS

| 196,704 | Switzerland | Mar. 31, 1938 |
|---|---|---|
| 707,253 | Germany | May 15, 1941 |
| 576,444 | Great Britain | Apr. 4, 1946 |
| 956,777 | France | Aug. 15, 1949 |